Feb. 27, 1968     T. B. FALK     3,370,532

TYPE BAR SETTING AND INKING MEANS IN ZIP CODE PRINTERS

Filed Aug. 22, 1966     5 Sheets-Sheet 1

INVENTOR.
THOMAS B. FALK

BY Kimmel, Crowell & Weaver
ATTORNEYS.

Feb. 27, 1968   T. B. FALK   3,370,532
TYPE BAR SETTING AND INKING MEANS IN ZIP CODE PRINTERS
Filed Aug. 22, 1966   5 Sheets-Sheet 2

INVENTOR.
THOMAS B. FALK

BY Kimmel, Crowell & Weaver
ATTORNEYS.

Feb. 27, 1968  T. B. FALK  3,370,532
TYPE BAR SETTING AND INKING MEANS IN ZIP CODE PRINTERS
Filed Aug. 22, 1966  5 Sheets-Sheet 3

INVENTOR.
THOMAS B. FALK

BY Kimmel, Crowell & Weaver
ATTORNEYS.

INVENTOR.
THOMAS B. FALK
BY Kimmel, Crowell & Weaver
ATTORNEYS.

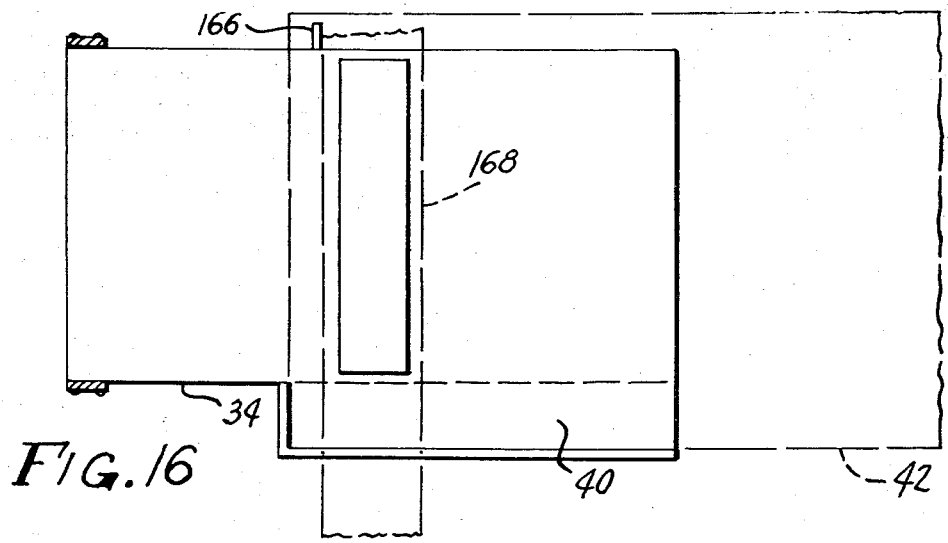
FIG. 16
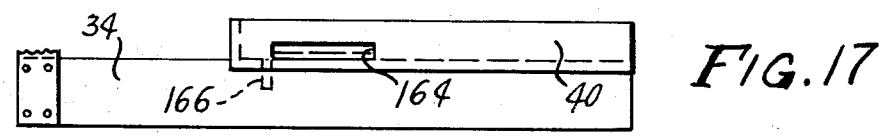
FIG. 17
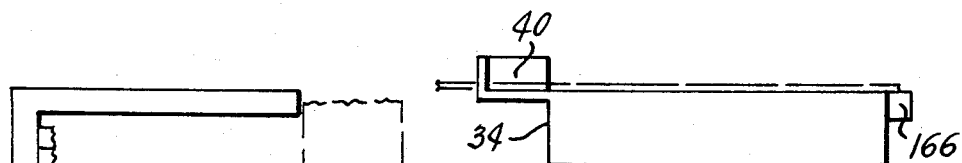
FIG. 18
FIG. 19
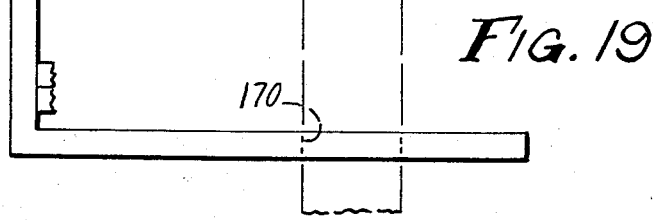
FIG. 20
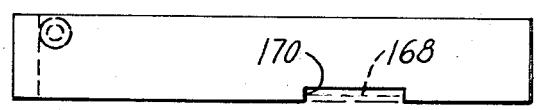
INVENTOR.
THOMAS B. FALK United States Patent Office 3,370,532
Patented Feb. 27, 1968

3,370,532
TYPE BAR SETTING AND INKING MEANS
IN ZIP CODE PRINTERS
Thomas B. Falk, 4035 California Ave.,
Carmichael, Calif. 95608
Filed Aug. 22, 1966, Ser. No. 574,083
5 Claims. (Cl. 101—98)

ABSTRACT OF THE DISCLOSURE

A stamping device for impressing ZIP codes on envelopes and the like which includes a base, a housing mounted above the base for both pivotal and reciprocable movement, an ink pad exposed upwardly in the base at one position, a plurality of slidable bars each carrying a set of numerals mounted in the rack and means for moving the bars longitudinally in the rack for exposing a selected set of numerals in alignment to the bottom of the rack such that when the rack is moved in one position the exposed set of numerals is inked and when it is moved reciprocably in the other position the exposed set of numerals may be pivotally impressed upon an envelope or the like is disclosed.

---

This invention relates to a stamping device for impressing ZIP code numerals upon letters and the like. More specifically, this invention relates to a thin, easily portable stamping device including a plurality of linear type bars, means for inking typed numerals, and means for guiding a letter or the like into position and means for impressing a desired ZIP code number on the letter or similar article.

The introduction, by the Post Office department, of a system of code numbers for identifying addressee locations, commonly known as ZIP codes, holds out the possibility of great savings of time and manpower in sorting mail in the future. In order to better facilitate the use of the ZIP code system, it will be necessary to provide a uniform size and style of numeral on the letter for ease of recognition and eventually for automatic reading machines. The provision of numerals of such uniform style and size as well as spacing cannot be met by handwriting or other methods of addressing, such as by typewriter, since there is a great diversity of style and spacing among typewriters.

It is an object of this invention to provide a ZIP code stamper which may be adapted to impress a ZIP code on an envelope in a given location and with a given style, size and spacing of the ZIP code numerals.

In order for the ZIP code system to become completely effective, devices must be made available to the public at nominal cost for impressing ZIP codes uniformly and legibly upon letters and the like. It is, therefore, an object of this invention to provide a ZIP code stamper which can be manufactured economically and which will impress a uniformly spaced and styled ZIP code number on letters and the like.

It will also be important to provide the public with ZIP code numeral impressing devices which are not only inexpensive but which are small and may be conveniently carried or stored in a desk drawer. It is, therefore, an object of this invention to provide a compact, easily carried, easily stored ZIP code numeral impressing device which may economically be manufactured and distributed.

It may become necessary or desirable in the future to impress letters and the like with numerals in magnetic ink or in other special inks. An object of this invention is the provision of a ZIP code numeral impressing device which may easily be adapted to impressing numerals in any desired type of ink and in any desired style and spacing of numerals on letters and the like.

It is also desirable to provide ZIP code numerals conspicuously and conveniently located on packages and unusual shaped parcels of all styles. One convenient method for accomplishing this desirable result is to stamp the ZIP code numeral on a strip of adhesive tape and stick the tape to the parcel at a desired position. An additional object of this invention is, therefore, the provision of a ZIP code numeral stamping device which may be utilized to impress ZIP codes on strips of adhesive tape.

An additional object of this invention is the provision of a ZIP code stamper which is small in size and which lies flat during periods of nonuse for easy carriage on the person and easy storage in the home or in an office.

The provision of novel operating mechanisms for positioning a plurality of linear type bars is also an object of this invention.

The provision of novel apparatus having advantages such as small size, ease of manufacture and simplicity of use is a further object of this invention.

The specific structures and mechanisms provided herein are also objects of this invention.

Other purposes and objects of the invention will become apparent to those skilled in the art from the specification which follows and the drawings to which reference is made.

In the drawings:

FIGURE 16 is a modification of the invention of FIGURE 1 showing means for handling tape and for impressing ZIP code numerals thereon.

FIGURE 17 is a side view of the invention of FIGURE 16.

FIGURE 18 is a front view of the invention of FIGURE 16.

FIGURE 19 is the tape numeral impressing modification of FIGURE 16 as applied to the invention of FIGURE 9.

FIGURE 20 is the tape guiding and impressing modification of FIGURE 1 as applied to the invention of FIGURE 12.

Figure 1:
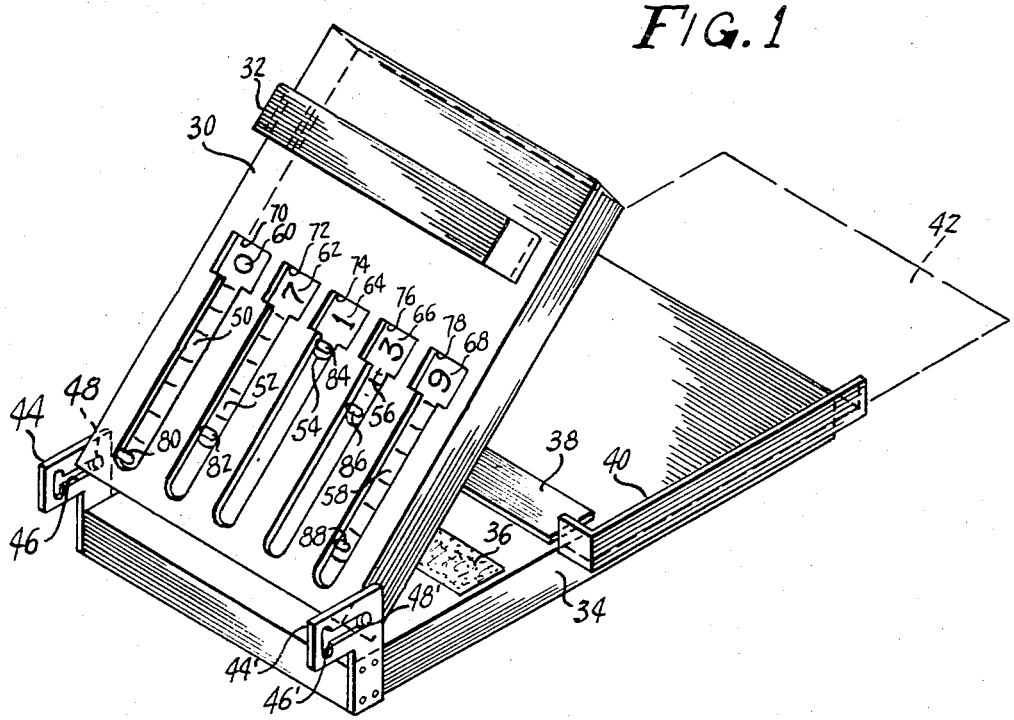
FIGURE 1 is a perspective of the ZIP code stamper of this invention showing the general organizational and functional features thereof.
Figure 2:
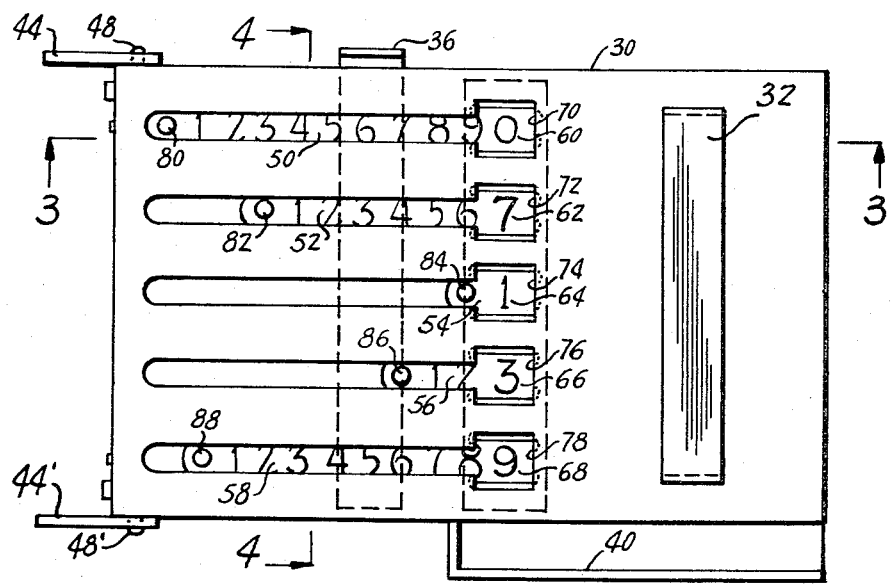
FIGURE 2 is a top view of the ZIP code stamper of this invention as shown in FIGURE 1.

With reference now to FIGURES 1 through 7, the invention in a preferred embodiment comprises a rack 30 which may include a gripping handle 32 on the top thereof, a base 34 in which is mounted an ink pad 36 and a resilient backing pad 38. Attached to the base 34 is a letter guide and positioning bracket 40 for positioning a letter 42 or the like for receiving the ZIP code. At one end of the base 34 there is secured a pair of upstanding members 44 and 44' which are supplied with longitudinal slots 46 and 46' which run generally parallel to the plane of the base. A pair of pins 48 and 48' extend from the sides of the rack 30 and are received in the slots 46. The upstanding members 44 with the associated slots and pins provide a pivotal interconnection between the base 34 and the rack 30. The rack 30, as best shown in FIGURE 1, includes slidably mounted therein a plurality of linear type bars 50, 52, 54, 56 and 58 which include, in a preferred embodiment, numeral indicia 60, 62, 64, 66 and 68 on the top thereof. As shown in the figures, FIGURES 1 and 2 for example, the numeral indicia are in the form of Arabic numerals and, as will be shown later, correspond to type numerals on the bottom of the type bars. While current practice dictates the use of a series of five Arabic numerals for ZIP coding mail, it will be understood that letters as well as numerals may be used in the future. Indeed, any intelligible indicia whether letter, numeral or mere arbitrary figures may be used. While in this specification the term "numerals" will be used throughout for simplicity and clarity, it will be understood that the term as used in the specification and the claims contemplates the inclusion of all intelligible indica such as Arabic and Roman numerals and letters which are, for the purposes of this invention, equivalent.

The numerals are displayed through a plurality of apertures 70, 72, 74, 76 and 78 which, as shown in FIGURE 1, include slotted portions to permit grouping knobs 80, 82, 84, 86 and 88 which extend upwardly from the type bars to slide freely. It will be apparent from the figures that in operation all that is necessary to select a desired ZIP code numeral is to move the type bars individually by the grouping knobs to the desired position.

Figure 3:
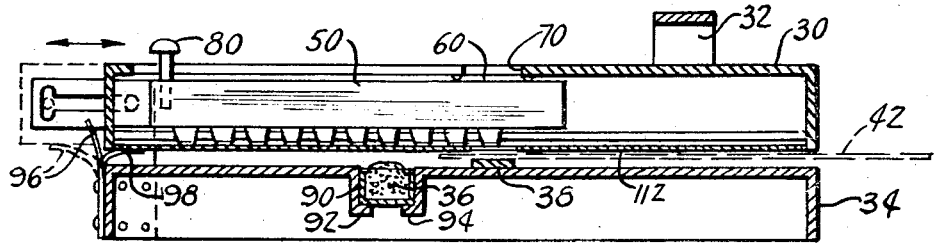
FIGURE 3 is a side view in partial cross-section of the invention as shown in FIGURE 2 taken substantially along lines 3—3.

With reference now more particularly to FIGURE 3, the ink pad 36 is contained in a tray 90 which is in turn slidably mounted in a pair of downwardly extending receiving flanges 92 and 94 in the base 34. A resilient spring member 96 is provided to bias the rack toward the opposite end of the base. Similarly, a resilient spring member 98 is provided to bias the rack upwardly to maintain a slight clearance between the rack and the base.

Figures 4, 6:
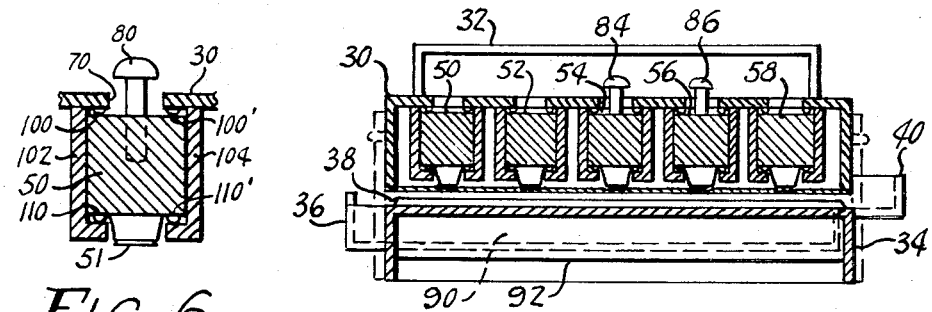
FIGURE 4 is an end view shown in partial cross-section taken substantially along lines 4—4 of FIGURE 2.
FIGURE 6 and FIGURE 7 are end views in partial cross-section showing the type bars and slidable mounting structure for the type bars.
Figures 5, 7:
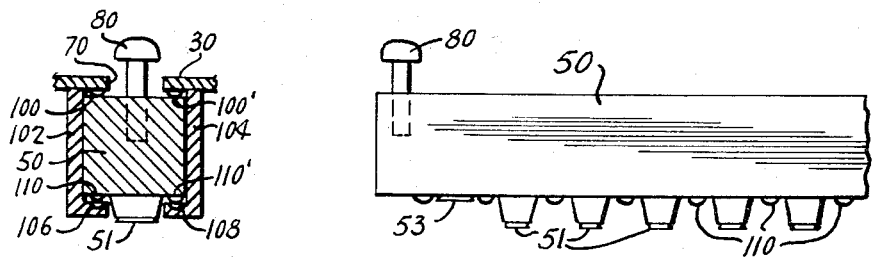
FIGURE 5 is a side view showing the detail of the linear type bars utilized in this invention.

As shown in FIGURE 4, the preferred embodiment of this invention includes five type bars lying parallel to each other for forming any desired five digit ZIP code number. A detail of an individual type bar is shown in FIGURE 5 to which reference is now made. The type bar designated as 50 is used as exemplary. The type bar 50 includes a plurality of type numerals 51 extending downwardly from the bottom thereof for impressing the ZIP code numerals on the letter. A blank space 53 may also be provided in case one or more numerals are not to be used or are unknown. The gripping knob 80 is mounted at one end, preferably, and extends upwardly therefrom. The type bar also includes a plurality of generally hemispherical protuberances which are shown in FIGURE 5 and the function of which is best explained with reference to FIGURES 6 and 7. The top of rack 30 includes a plurality of generally hemispherical downward protuberances 100 adjacent the apertures therein, as shown in FIGURE 6. Extending downwardly from the top of rack 30 is a pair of supports 102 and 104 in which the type bar is slidably received. These supports, 102 and 104, are generally L-shaped in cross-section and include runner portions on the bottom which include a plurality of indentations 106 and 108, best shown in FIGURE 7. These indentations selectively receive a plurality of the protuberances 110 and 110' which extend downwardly, and the respectively sides, from type bar 50. It will best be seen that the type bar 50 is slidably received in a channel formed by supports 102 and 104 and is held in a selected position by coaction of protuberances bearing on the top of the type bar and protuberances and indentations coacting at the bottom of the type bar. In practice, the slide bar 50 is easily slidable from any position to any other desired position but the indentations and the coaction with the protuberances is sufficient to prevent undesired movement of the type bars and to maintain the type bars in the desired position.

The operation of the ZIP code stamper of this invention can best be described with reference to FIGURES 1 and 3. When it is desired to impress a ZIP code on a letter or the like, the letter 42 is placed on the base plate 34 as shown in FIGURE 1 and is maintained in a desired position by the guide 40. The portion of the letter upon which the ZIP code is to be impressed rests above resilient base pad 38 which is on the base 34. The desired ZIP code combination is selected by moving the type bars to the desired positions and viewing the numeral indicia on the top of the type bars through the apertures in the rack 30. As previously explained, once placed in position the type bars will remain so placed until intentionally moved. In order to ink the type the rack is moved backward, to the left as shown in FIGURE 3, against the biasing action of the resilient spring 96 and is depressed against the biasing action of resilient spring 98 to place the type numerals in contact with the ink pad. The rack is then raised and permitted to return to its normal position and depressed causing the inked numerals to contact the letter and impress the ZIP code numeral thereon. It will be realized, of course, that the ink pad 36 may include ink of any desired color or type, such as magnetic inks or other special inks. It will also be realized that since the ZIP code will be of a standardized numeral style and spacing will be located at a fixed position on the letter, its recognition by personnel and by machines will be more easily accomplished.

Figure 8:
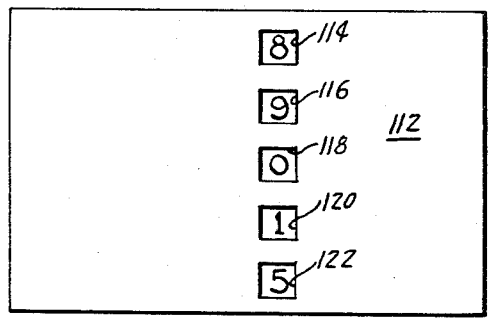
FIGURE 8 is the bottom view of the rack in which the type bars are slidably mounted.

While it is not essential to the invention, the bottom of the rack 30 preferably comprises a thin plate 112 which is of a resilient material such as thin, relatively flexible steel, plastic or other material. The plate 112 which is shown in FIGURE 8, may include a plurality of apertures therein 114, 116, 118, 120 and 122 or it may include a single aperture extending substantially across the plate. The function of the plate will be apparent. It exposes only the type numerals which are of interest with respect to the ZIP code being impressed on the letter. When the rack 30 is pushed downwardly the letter 42 is held on resilient backing 38 and the type numerals project through the aperture or apertures in plate 112 to impress the ZIP code on the letter.

Figure 9:
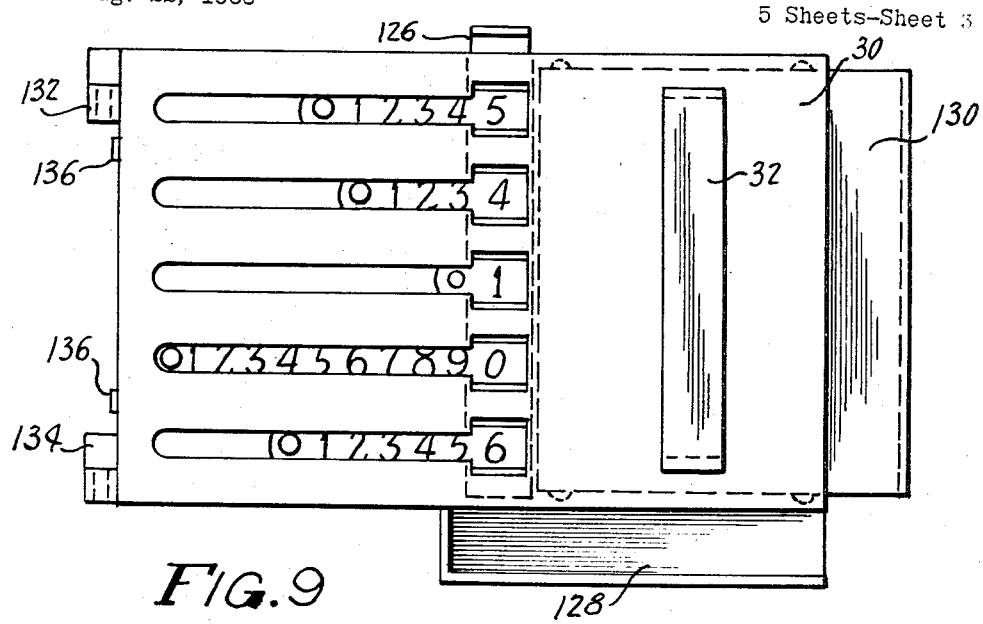
FIGURE 9 is a modification of the invention of FIGURES 1 and 2 shown in top view.
Figure 10:
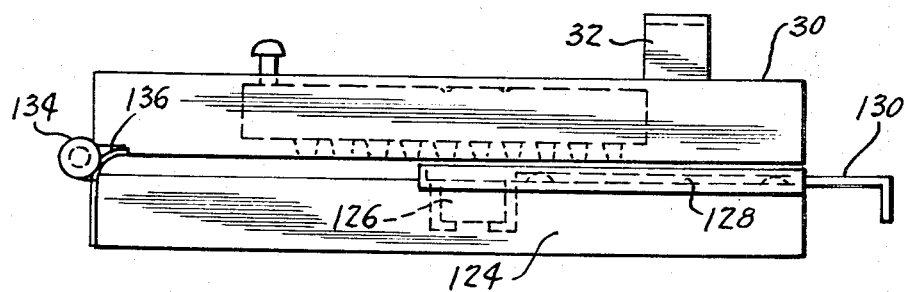
FIGURE 10 is a side view of the invention shown in FIGURE 9.
Figure 11:
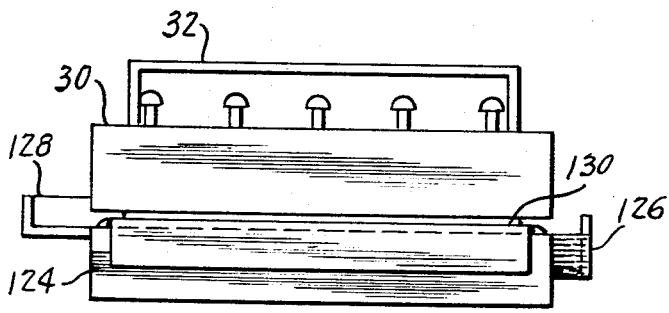
FIGURE 11 is a front view of the invention of FIGURE 9.

FIGURES 9, 10 and 11 show a modified embodiment of the invention as just described. The rack is shown in generalized drawings and is substantially as previously described and shown in the previous figures. In the embodiment of the invention of FIGURE 9, a base plate 124, best shown in FIGURE 10, is provided which carries in it an inking pad 126 and is provided with a letter guide 128 in a manner similar to that described with the embodiment of FIGURE 1 except that the position of ink pad 126 corresponds to the position of the resilient pad 38 of the invention of FIGURE 1. A slidable cover 130 is provided in the base plate 124 for selectively covering and uncovering the ink pad 126. The rack is pivotally interconnected with the base plate 30 by a pair of dowel and sleeve hinges 132 and 134 and is resiliently restrained upwardly by spring member 136. In operation, the type numerals to be used for impressing the ZIP code on a letter are inked by withdrawing the slidable cover 130, depressing rack 30 to contact the type numerals with the ink pad 126, covering the ink pad with slidable cover 130, inserting the letter in the letter guide 128 and depressing the rack 30 to cause the type numerals to contact the letter and impress the ZIP code thereon.

Figure 12:
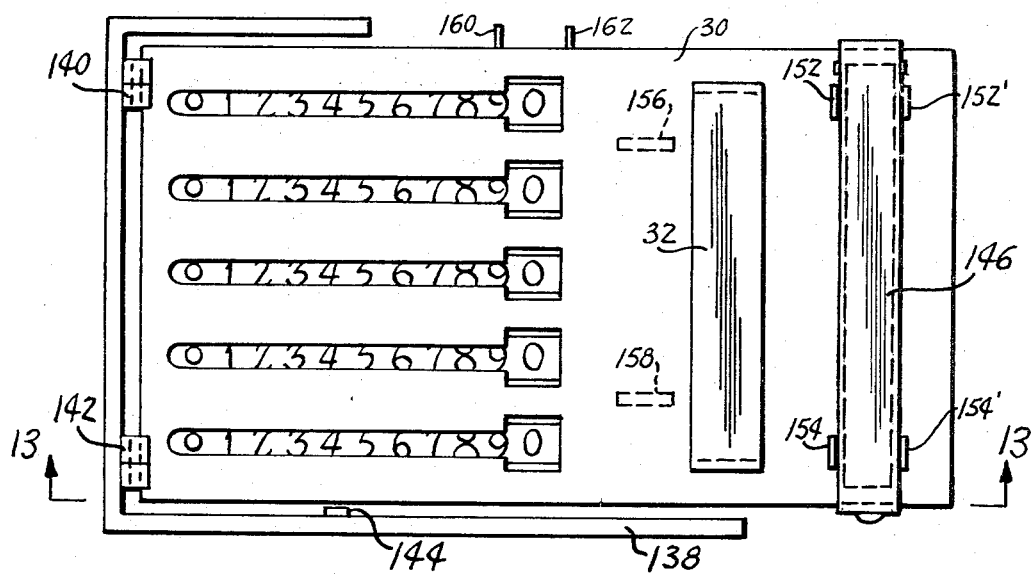
FIGURE 12 is an additional modification of the invention of FIGURE 1 shown in top view.
Figure 13:
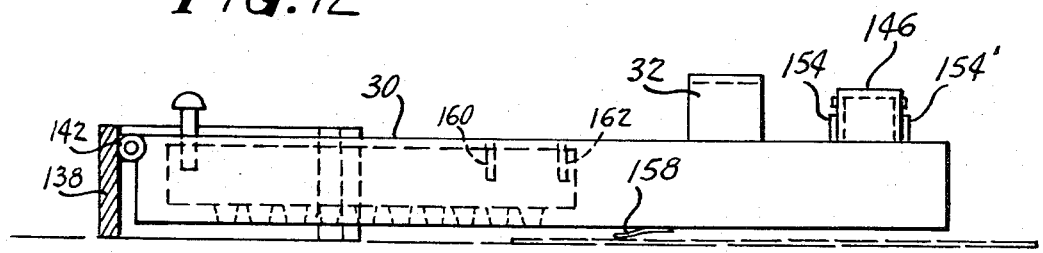
FIGURE 13 is a side view in partial cross-section of the invention of FIGURE 12 taken substantially along lines 13—13.
Figure 14:
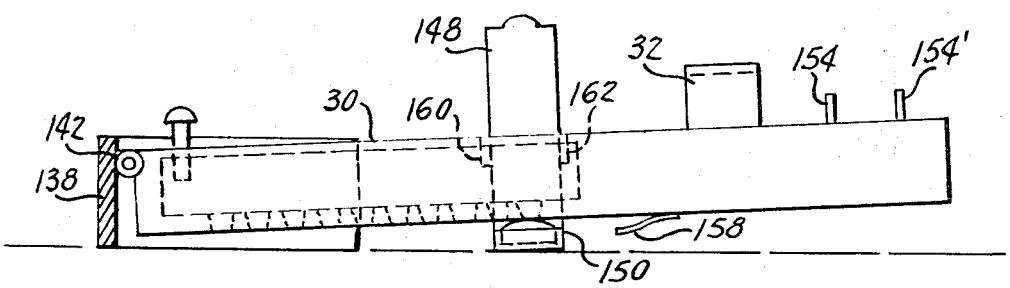
FIGURE 14 is a side view of the invention of FIGURE 12 shown in partial cross-section with the ink pad in contact with the type numerals.
Figure 15:
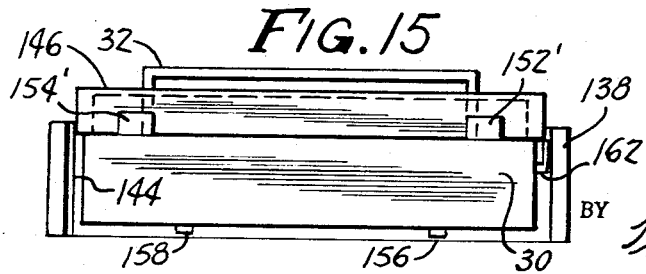
FIGURE 15 is an end view of the invention of FIGURE 12.

An additional embodiment of the invention is shown in FIGURE 12. In this embodiment, the base plate is replaced by a letter positioning guide 138 which is pivotally interconnected with rack 30 by a pair of dowel hinges 140 and 142 and includes a stop 144 to assist in positioning the letter. In this embodiment, the ink pad 146 is removably received on the top of rack 30 and includes a cover 148 for the inking pad portion 150 which, as best shown in FIGURE 14 may selectively be positioned under the desired type members. The inking pad 146 is stored, with cover 148 protecting the ink pad portion 150, in a pair of clips 152 and 152' and 154, 154' on the top of rack 30. Rack 30 is provided, additionally, with a pair of spring clips 156 and 158 to maintain the rack above a horizontal surface such as a desk top. Rack 30 is also provided with a pair of guide clips 160 and 162 for positioning the ink pad 146 during the inking step. Once the type numerals are inked, they are contacted against the letter in the conventional manner to impress the ZIP code thereon.

In addition to marking letters and similar articles of convenient size with the ZIP codes, as may be done directly by the devices as previously described, it is also desirable to provide packages and large envelopes as well as unusual sized containers with ZIP codes for ease in routing. FIGURES 16, 17 and 18 show a modification of the invention of FIGURE 1 to provide means for impressing a ZIP code on a strip of adhesive tape which may then be secured to the package in a desired location. For simplicity, only the relevant parts of the invention of FIGURE 1 are shown. In this embodiment the letter guide 40 is provided with a slot 164 for guiding the tape on one side and a lug 166 for guiding the tape on the other side. As best shown in FIGURES 16 and 18, a strip of adhesive tape 168 may be guided across the base plate 34 beneath the type numerals and may thereby be impressed with the desired ZIP code. It will be apparent also that the device may be used in the conventional manner to impress ZIP codes on a letter 42 or the like.

This same modification may be applied equally to the embodiment of FIGURE 9.

The embodiment of FIGURE 12 is modified by providing a recess 170 in the letter guide 138 for guiding the tape 168 across the ZIP code stamping device to receive the desired ZIP code.

The embodiments of FIGURE 9 and FIGURE 12 may also be used to mark letters and the like and tapes with ZIP codes interchangeably.

It will be seen that all the objects of the invention are accomplished by the previously described device. It will be apparent that the invention may be made economically and sturdily and will occupy a minimum of space. It may be used in the home or in the office. The devices for stamping ZIP codes on letters and the like of this invention may be distributed at nominal cost to the public and provide means for uniformly marking letters and the like with ZIP codes. It will be apparent that the provision of simple, inexpensive and reliable means for reproducibly marking letters and the like with ZIP codes of numerals of uniform style and size as well as spacing is an important step in providing automatic mail sorting. Obviously, any special ink or marking fluid may be used in this invention.

While this invention has been described with specific examples and the best forms which have presently been developed, there will be many changes and modifications which will become apparent to those skilled in the art and which may be adapted to this invention without departing from the spirit thereof. It is intended therefore, that the examples of the drawings as previously described be considered as merely exemplary of the devices of this invention and not as limiting the scope of the invention. The most obvious change would be, as previously indicated, the use of letters or other intelligible indicia which are fully equivalent to the numerals shown in the drawings. Indeed, the term "numerals" would include such indicia. It is therefore intended that the scope of the invention be limited only by the appended claims.

I claim:
1. A ZIP code stamping device which, in combination, comprises:
   a supporting base having an upper surface;
   an ink pad mounted transversely of the base and exposed on said upper surface;
   a rack housing having upper and lower members secured together in spaced relation;
   a plurality of type bars slidably mounted longitudinally in the rack housing parallel with each other;
   each of said type bars including a desired set of numerals on the bottom and including a gripping means on the top thereof;
   said rack housing being so constructed and disposed as to permit the gripping means to extend upwardly therefrom and to permit a numeral on each type bar to be exposed downwardly for selectively being inked and for printing an envelope or the like resting on said upper surface; and
   means mounting the rack housing above the base for both pivotal and reciprocable movement for permitting a selected series of numerals on the type bars which are exposed downwardly to be inked by the ink pad when the rack housing is in one position and to be pivotally moved downwardly when the rack housing is in another position spaced longitudinally from the one position for impressing the desired numeral series on an envelope or the like which is resting on the upper surface of the base.

2. The device of claim 1 wherein the longitudinal type bars include numeral designations on the top side thereof corresponding to the type numerals on the bottom side thereof and wherein the top of the rack housing forms apertures for exposing only those numeral designations which correspond to type numerals exposed on the bottom side of the rack housing.

3. The device of claim 3 wherein the pivotal mounting means comprises a pair of upright members having slots formed substantially parallel to the base therein, and a pair of pins on the respective sides of the rack housing, said pins being received in the slots for permitting reciprocable motion of the rack between a first position wherein the exposed type numerals are in juxtaposition to the ink pad and a second position wherein the type numerals are in juxtaposition to an area for receiving an envelope or the like on which the ZIP code is to be impressed.

4. The device of claim 1 further comprising:
   rack gripping means on the top of the rack housing for permitting the user to control the movement of the housing;
   means secured to the base plate for receiving and positioning a letter or the like on which the ZIP code number is to be impressed;
   said pivotal mounting means interconnecting the ends of the base plate and the rack housing, said mounting means comprising,
   a pair of upstanding members having slots formed therein parallel to the base plate,
   a pair of pins received by the slots extending from the sides of the rack to permit reciprocable motion of the rack from a first position wherein the exposed type numerals are in juxtaposition to the ink pad to permit downward pivotal movement of the rack for causing contact of the exposed type numerals with the ink pad to a second position wherein the type numerals are in juxtaposition to permit pivotal rack housing motion for causing the type numerals to contact a letter or the like received in the letter positioning means; and biasing means for resiliently retaining the rack in the second position.

5. The device of claim 4 wherein the letter receiving and positioning means further includes a slot and a guide post for guiding a tape across the base plate in juxtaposition to the exposed type numerals in the second position.

References Cited

UNITED STATES PATENTS

| 461,344 | 10/1891 | Konigslow et al. | 101—98 |
| 509,858 | 12/1893 | Anton | 101—103 |
| 1,465,388 | 8/1923 | Dryer | 101—20 |
| 1,575,885 | 3/1926 | Woodward | 101—20 |
| 1,610,640 | 12/1926 | Willis | 101—20 |
| 1,794,266 | 2/1931 | Whitaker | 101—94 X |
| 1,862,529 | 6/1932 | Dickman | 101—94 |
| 2,047,939 | 7/1936 | Catucci | 101—19 |
| 2,517,354 | 8/1950 | Rostock | 101—20 |
| 3,105,436 | 10/1963 | Rounds | 101—20 |

WILLIAM B. PENN, *Primary Examiner.*